Aug. 1, 1961   W. WHALEY   2,994,393
VEHICLE CONTROL SYSTEMS
Filed Nov. 4, 1957   5 Sheets-Sheet 1

INVENTOR
WILLIAM WHALEY,
BY
ATTORNEYS

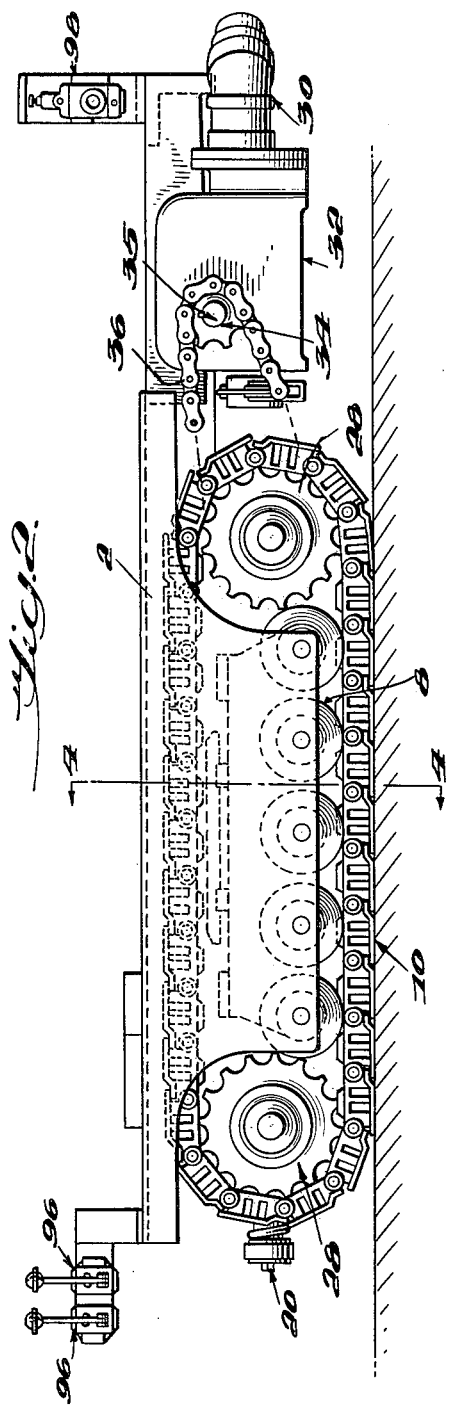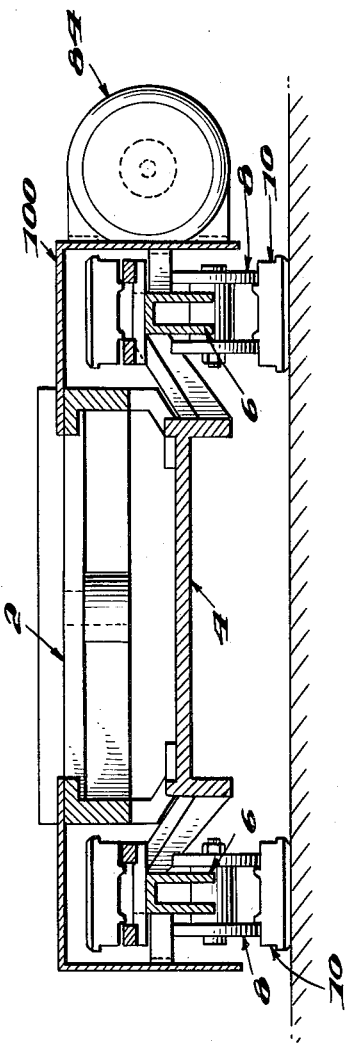

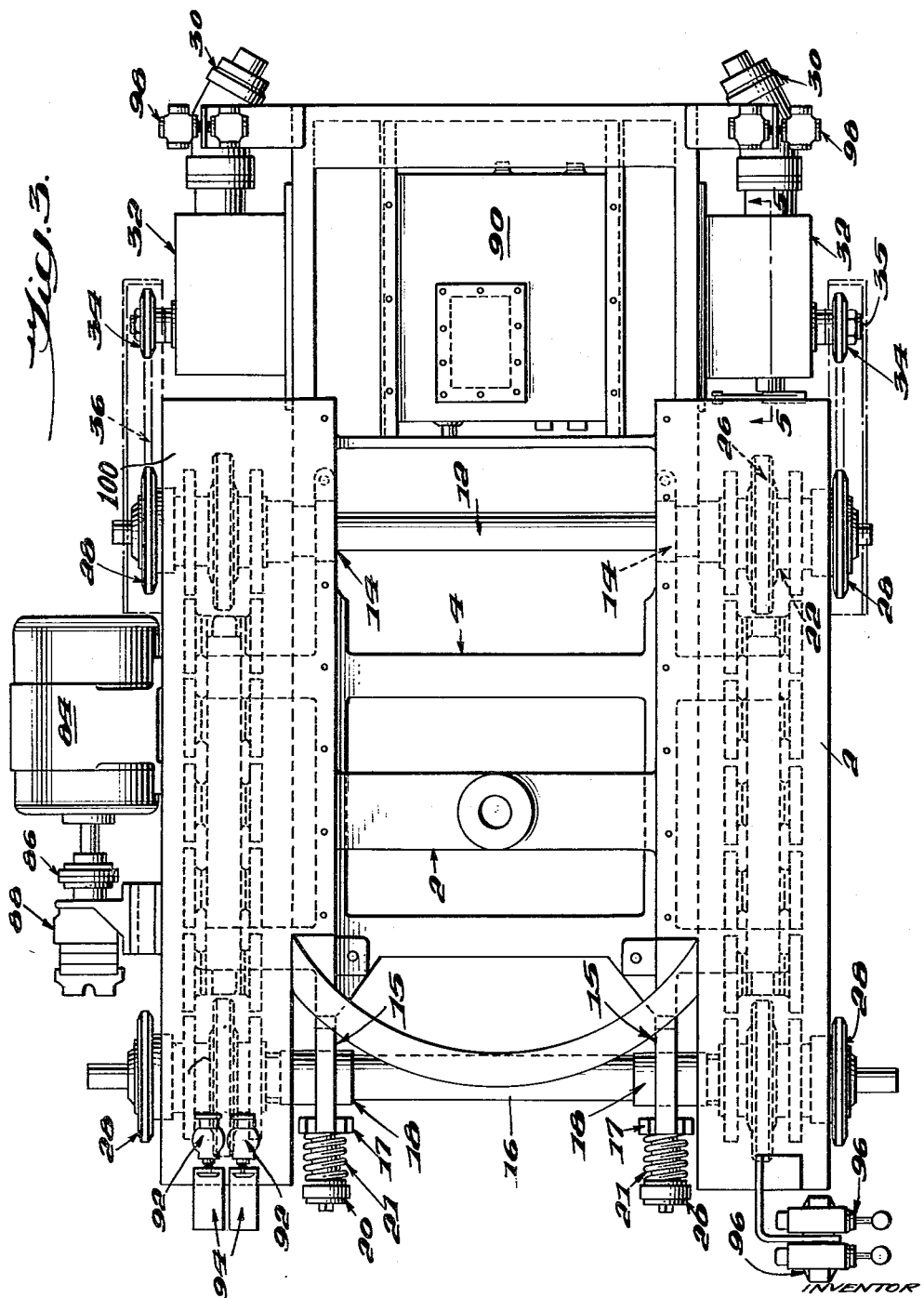

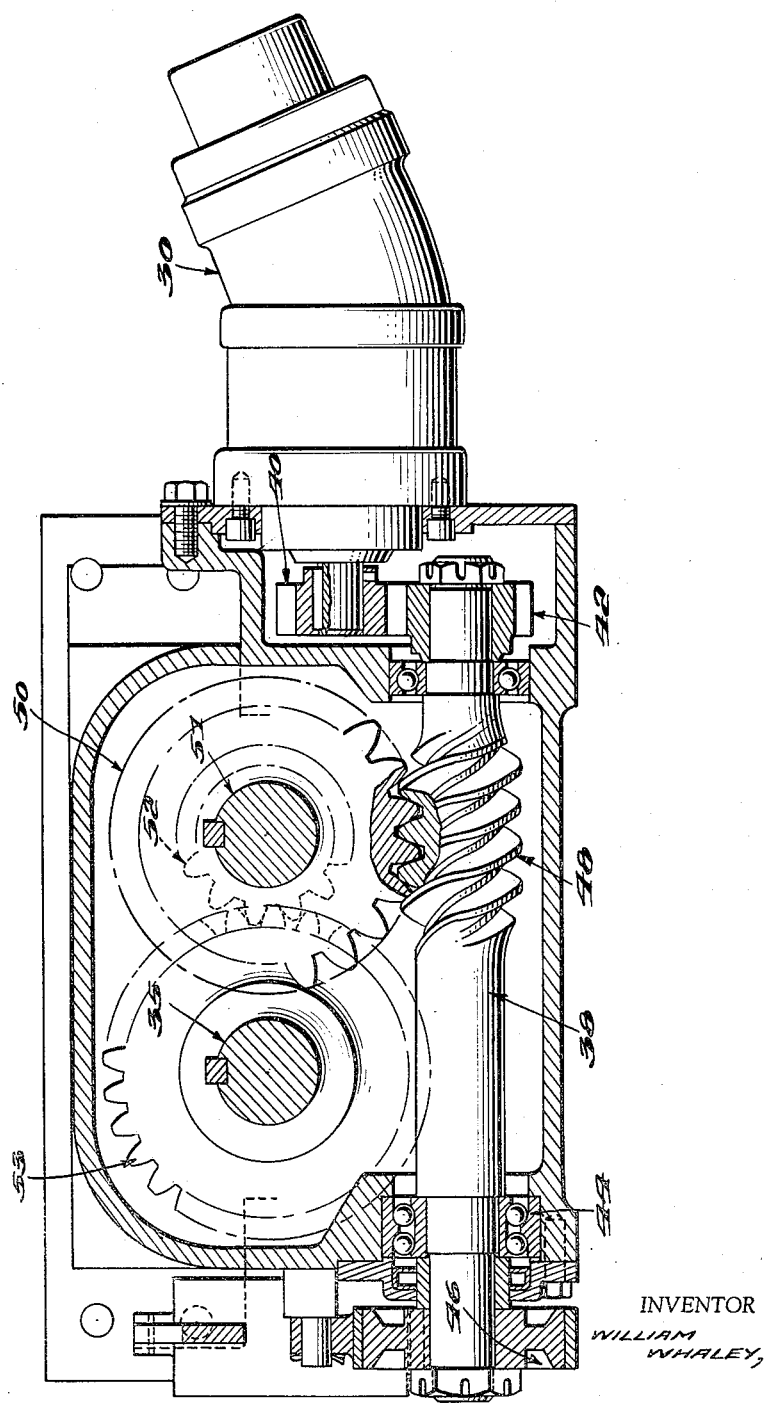

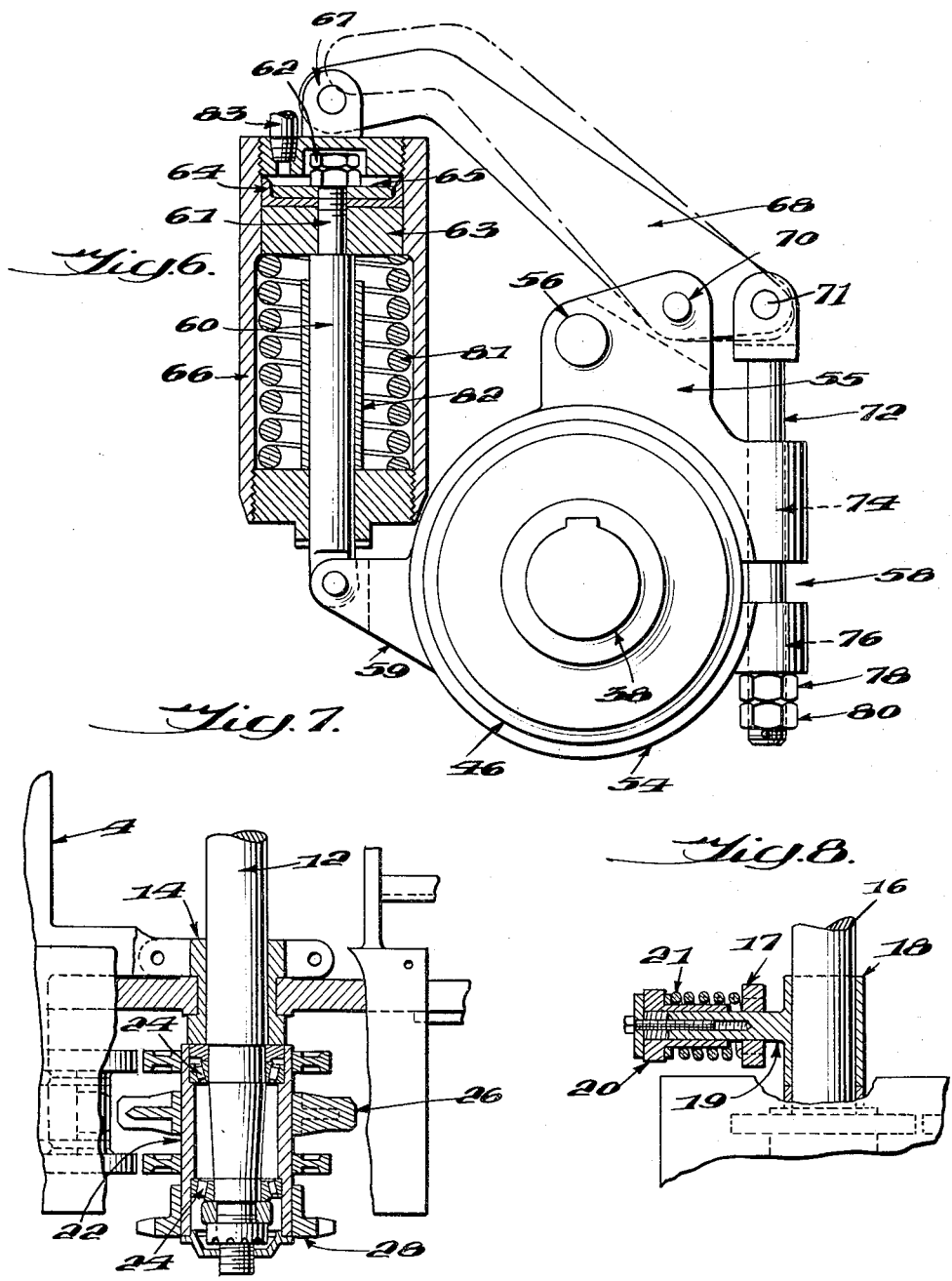

United States Patent Office 2,994,393
Patented Aug. 1, 1961

2,994,393
VEHICLE CONTROL SYSTEMS
William Whaley, P.O. Box 789, Knoxville, Tenn.
Filed Nov. 4, 1957, Ser. No. 694,343
9 Claims. (Cl. 180—6.48)

The present invention relates to vehicle control systems, and more particularly to parking or holding brakes for hydraulic powered crawler-type vehicles.

Loaders, diggers, and drills are usually mounted on crawler-type vehicles. The vehicle must be movable to transport and locate the machine in position to do its work. However, once the machine is fixed in the proper location, it is important that the crawler remain in that position. Handbrakes have been utilized for this purpose, but have not been effective because of wear on the brake linings and the failure of the operator to apply the brakes due to his negligence or forgetfulness.

Having in mind the defects of prior art brakes, it is an object of the present invention to provide a brake for a crawler-type vehicle which operates automatically when the vehicle stops.

Another object of the present invention is to provided a brake of the type described, having a brake lining that is subject to a minimum of wear.

A still further object of the present invention is to provide a brake which is small, but which produces a high resistance to movement.

The foregoing objects, and others ancillary thereto, I prefer to accomplish as follows:

According to a preferred embodiment of the invention, reversible hydraulic motors transmit power through gear boxes to crawler treads on each side of the vehicle. The gear box contains a worm gear which is connected to the hydraulic motor. A brake operates on a brake drum on the opposite end of the worm shaft. Hydraulic fluid is supplied under pressure to operate the hydraulic motors. A brake cylinder associated with the brake is also connected with the hydraulic system. When the hydraulic motor is operating, hydraulic pressure will cause a piston in the cylinder to expand and release the brake. When the hydraulic motors are stopped, the opposite occurs and the brakes are applied. The brake thereby prevents movement of the worm gear and, consequently, the crawler treads, when the vehicle is stopped.

This preferred embodiment of the invention is illustrated in the accompanying drawings, in which:

FIG. 2 is a side elevation of a crawler-type vehicle;

FIG. 3 is a top plan view of a crawler-type vehicle;

FIG. 4 is a cross section of the crawler-type vehicle, taken along the line 4—4 in FIG. 2;

FIG. 5 is a cross-sectional view of the gear box, taken along the line 5—5 in FIG. 3;

FIG. 6 is an elevational view of the parking brake and a cross-sectional view of the brake cylinder;

FIG. 7 is a cross-sectional view of the front axle mounting; and

FIG. 8 is a cross-sectional view of the rear axle bearing showing details of adjustment.

Figure 1:
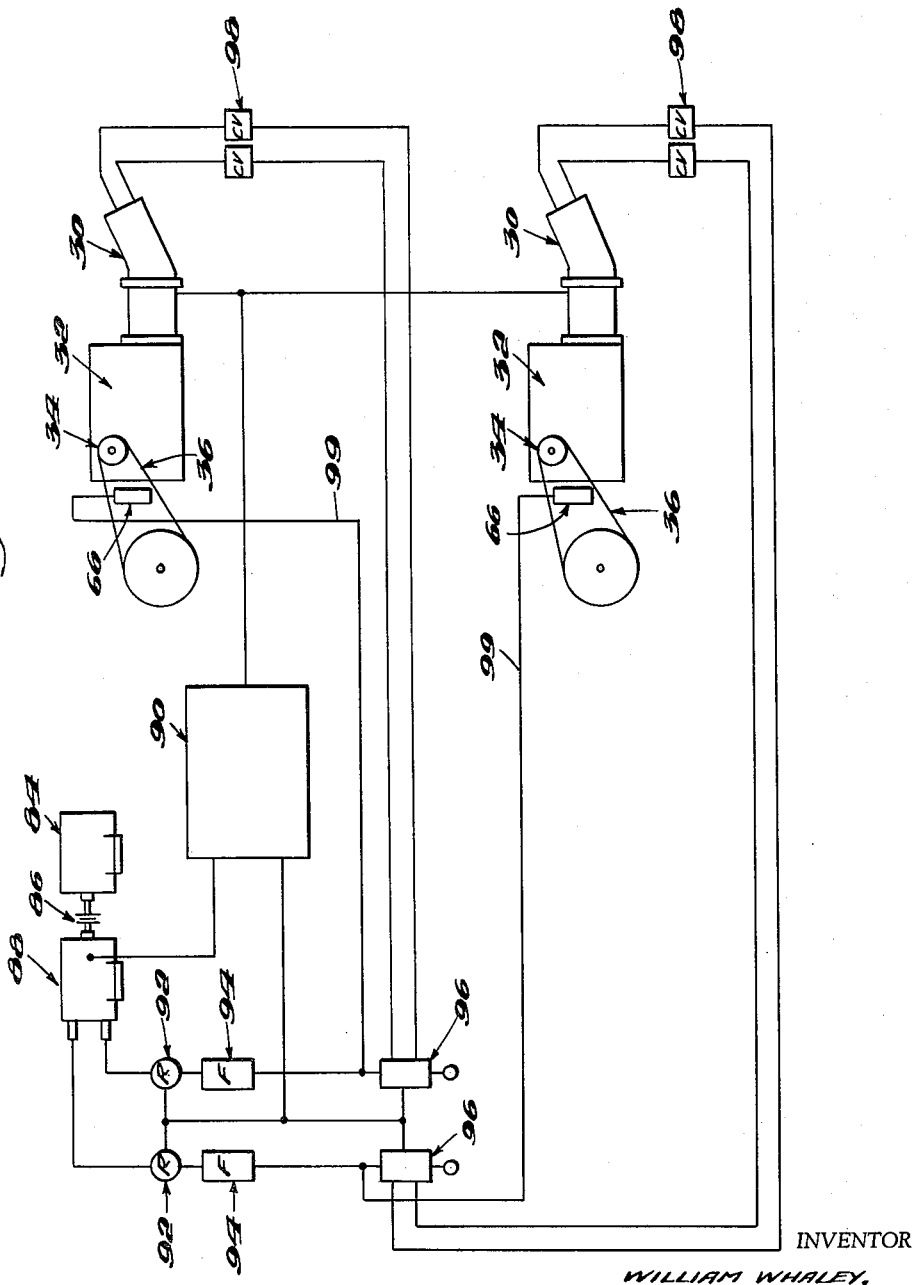
FIG. 1 is a diagram of the hydraulic system used in the present invention.

The crawler-type vehicle, shown in FIGS. 2, 3 and 4, consists of a main frame 2, which is mounted on a sub-frame 4. The sub-frame 4 carries side frames 6 on which are journaled rollers 8 which ride on an endless crawler tread 10, thereby supporting the vehicle. A front axle 12 and a rear axle 16 are also mounted on the sub-frame 4.

As shown in FIG. 7, the front axle 12 is keyed, or otherwise secured, in journal boxes 14 mounted on the sub-frame 4. Each end of each axle is provided with a hub 22, journaled in bearings 24 on the axle. A sprocket 26 is secured to the hub 22 so that, as the hub rotates, the sprockets 26 will engage the treads 10 to cause the vehicle to travel over the ground. A drive sprocket 28 is fixed to the outer end of each hub 22 on both axles. The sprockets on the rear axle are driven by the tread 10 and can be used as a power take-off to operate equipment mounted on the vehicle.

The rear axle 16, as shown in FIGS. 3 and 8, is keyed in slidable bearings 18, which are adjustable, longitudinally, in rings 15 (FIG. 3) in the sub-frame 4. The rings 15 and the collars 17 are rigid with respect to the sub-frame 4. Each ring 15 terminates in a collar 17, through which extends a journal rod 19 on the bearing 18. An adjusting nut 20 determines the position of the bearing 18 in the ring 15. A spring 21, under compression, coacts against the collar 17 and the nut 20, thereby forcing the bearing rearward in the ring. This maintains the necessary tension on tread 10.

Referring to FIGS. 2 and 3, a reversible hydraulic motor 30 is mounted on each sided of the vehicle. Each motor 30 is connected to speed reducing gearing, generally indicated at 32. A sprocket 34 is keyed to the output shaft 35 of the gearing 32, and the sprocket 34 drives a chain 36, which drives sprocket 28 on each hub of the front axle 12, causing the tread 10 to move over sprockets 26.

Referring to FIG. 5, the hydraulic motor 30 drives a worm gear shaft 38 at one end, through spur gears 40 and 42. The opposite end portion of the worm gear shaft is journaled in bearings 44. The shaft 38 extends through the gear box wall beyond the bearings 44, and a brake drum 46 is keyed to the extension of the shaft 38.

A worm 48 on the worm shaft 38 meshes with a helical gear 50 which is keyed to a shaft 51. A spur gear 52 is also keyed to shaft 51 and is in mesh with a gear 53 which is keyed to the output shaft 35. The relationship of the gears in the gear box is such that the output shaft rotates at a slower speed than that of the motor 30.

Referring to FIG. 6, an alloy steel brake band 54 is fitted over the brake drum 46, and is carried by a bracket 55, pivotally mounted on a pin 56 which projects out from the wall of the gear box. The brake band 54 is provided with a slot 58 to allow circumferential expansion of the band. A second bracket 59 projects from the brake band 54 at a point diametrically opposite the slot 58. A piston rod 60 is pivotally secured at one end to the bracket 59. The opposite end of the piston rod 60 has a portion 61 of reduced diameter. Clamped between the shoulder of the reduced portion 61 and nuts 62 are a piston 63, leather packing 64, and a washer 65.

The piston 63 is slidably supported in a brake cylinder 66. The head of the brake cylinder is provided with two ears 67, between which is pivotally secured one end of a lever 68. The opposite end of the lever 68 is pivotally secured to the brake band bracket 55 by a pin 70. Adjacent the pin 70, the bifurcated end of a rod 72 is pivotally secured at 71 to the lever 68. The rod 72 passes through aligned holes 74 and 76 in the brake band 54, and is threaded to receive an adjusting nut 78 and a jam nut 80.

Within the brake cylinder 66, a coiled spring 81 is compressed between the piston 63 and the bottom of the brake cylinder. A rigid or metal tube 82 is slidably fitted over the piston rod 60 and acts as a stop to prevent the piston 63 from compressing the spring 81 too greatly. A port 83 in the brake cylinder head permits hydraulic fluid to flow into the brake cylinder.

When hydraulic fluid under pressure enters the cylinder 66 through the port 83, the cylinder 66 will move upward, causing the lever 68 to be rotated about pin 70 to the position shown in dotted lines in FIG. 6. Thus, through the movement of the rod 72, the pressure of the brake band on the brake drum will be released. The elasticity of the alloy steel brake band will cause it to expand away from the surface of the brake drum 46 to the extent that the movement of the rod 72 will allow.

When the pressure on the hydraulic fluid is reduced, the spring 81 causes the cylinder to return to its normal position which pulls on the rod 72 by means of the rotation of lever 68, thereby tightening the brake band against the brake drum. The adjusting nut 78 and the jam nut 80 permit the adjustment of the pressure on the brake drum when the brake band is tightened. When hydraulic fluid under pressure is supplied, the brake is released and when the hydraulic fluid pressure is reduced, the brake is applied.

Referring to the hydraulic system as shown in FIG. 1, the drive shaft of an electric motor 84 is connected through a flexible coupling 86 to a fluid pump 88 having two independent discharge ports. A tank 90, mounted on the main frame 4 of the vehicle, is the reservoir for hydraulic fluid. The hydraulic system for each motor is the same.

Hydraulic fluid is drawn from the tank 90 by the pump 88. The fluid is pressurized by the pump and passes through a relief valve 92 and a filter 94 to a four-way control valve 96. The control valve can be adjusted to operate the hydraulic motor 30 in either direction or to stop the motor by cutting off the flow of fluid to it.

When the control valve is in the open position, fluid flows through a counterbalance valve 98 to the motor 30. The fluid causes the shaft of the motor to rotate, which, through the gearing 32, causes the sprocket 34 to rotate. This rotation is transmitted to the tread 10 by means of the chain 36. After the fluid has passed through the motor 30, it flows back to the tank 90.

When the control valve 96 is in the closed position, fluid will flow through the valve and back to the tank 90, by-passing the motors 30. Since there is little resistance to the flow, the pressure of the fluid will be low. When the control valve is in the open position, the motor 30 will maintain a high pressure on the fluid since it must flow through the motor before returning to the tank 90. Therefore, when the motors are operating, the hydraulic pressure will be high and when the motors are stopped the hydraulic pressure will be low.

A hydraulic hose 99 connects the brake cylinder 66 to the hydraulic supply line at a point between the pump 88 and the control valve 96. Thus, when the hydraulic pressure in the supply line is high, it will be communicated to the brake cylinder and cause the piston 63 to expand in the cylinder, thereby releasing the brake on the worm shaft of the gear box 32. When the pressure in the supply line is low, spring 81 will force the fluid out of the cylinder, thereby applying the brake to the worm shaft of the gear box 32.

When the control valve 96 is opened, the brake 54 will be released and the motor 30 will begin to operate. Conversely, when the control valve 96 is closed, the brake 54 will be applied and the motor 30 will stop.

The helix angle of the worm 48 is too great for self-locking, but a large torque on the drive sprocket 34 can be resisted by a small torque on the worm 48. Therefore, only a small brake is required on the worm shaft 38 to prevent the tread 10 from moving when the motor 30 is stopped. Also, since the brake is applied after the motor has stopped and released before the motor starts, there will be no appreciable wear of the brake band on the brake drum.

The hydraulic equipment, as shown in FIGS. 2, 3 and 4, is mounted on the sides of the vehicle, to present an unobstructed top to receive loading and conveyor equipment, which is interchangeably mounted on the main frame. 2. The electric motor 84 and hydraulic pump 88 are mounted on a side plate 100 (FIG. 3) of the main frame 2. The relief valves 92 and the filters 94 are mounted on the rear of the main frame adjacent to the dicharge of the hydraulic pump 88. The control valves 96 are mounted on the top of the main frame at the rear of the vehicle. The reservoir tank 90 is mounted between sills of the main frame 2, at the front of the vehicle. Counterbalance valves 98 are mounted on each corner at the front of the vehicle, directly over the motors 30. The motors 30 and gear box 32, as previously described, are mounted on the side of the main frame.

In operation, the operator of the vehicle stands on the right side at the rear of the vehicle, adjacent to the control valves 96. The electric motor 84 is supplied with electric current by a cable from a source of electricity, so that the motor and pump 88 operate continuously. The pump draws hydraulic fluid from the tank 90 and discharges it through relief valves 92 and filters 94 to the four-way control valves 96.

When the valve 96 is in the closest position, fluid will flow through the valve and back to the tank 90. Thus, when the valve 96 is closed, fluid will circulate through the pump, relief valve, filter, and tank.

When the valve 96 is in the open position for forward movement of the treads, fluid will flow through the line to the fluid motor 30, causing it to rotate. Since the motor resists the flow of fluid, the pressure in the supply line will rise. This pressure rise causes the brake 54 to be released, thereby allowing the worm shaft 38 to be rotated by the motor 30. Sprockets 34 will be caused to rotate, driving the chains 36, which drive the treads 10 forward. After being exhausted from the motor 30, the fluid returns to the tank 90.

When it is desired to stop the movement of each tread, the valve is returned to the neutral position. This cuts off the flow of fluid to the motor, and directs it back to the tank 90. The pressure in the supply line will, therefore, drop, allowing spring 81 in the brake cylinder 66 to expand, thereby applying the brake. Since the motor has already stopped rotating, the brake is applied when the worm shaft 38 is not rotating.

The tread 10 will move backward when the control valve 96 is moved to the other open position. Fluid will flow through the other line to the motor, which causes the motor to rotate in the opposite direction. The operation of the brake and the flow of fluid is otherwise the same as for forward movement of the tread.

The right-hand tread and the left-hand tread operate independently of each other. There is a separate control valve 96 for each tread and in all respects the operation of the two treads are identical. By moving the right-hand tread forward, or the left-hand tread backward, the vehicle will turn to the left. By moving the right-hand tread backward, or the left-hand tread forward, the vehicle will turn to the right. The treads can also be operated together for movement of the vehicle in a forward or backward direction.

One advantage of this invention is that the movement of the vehicle can be controlled by the manipulation of only two levers, located conveniently together on the vehicle. These levers permit the operator to move the vehicle forward or backward, or to steer it. In addition, a brake is automatically applied whenever the drive motor is stopped, insuring that the vehicle will remain stationary when the movement is stopped. An automatic brake of this type, of course, eliminates the danger of the operator failing to apply the brake whenever the vehicle has stopped.

Another advantage of this invention is that the brake is applied only when the worm shaft of the gear box is not rotating. Therefore, since there is no relative rotation between the brake drum and the brake band, there will be no appreciable wear of these parts.

While the invention has been illustrated and described in one embodiment, it is recognized that variations and changes may be made therein, without departing from the invention as set forth in the claims.

I claim:

1. In a vehicle control system of the type described, a fluid supply line communicating with a source of fluid pressure, an hydraulic motor connected to said fluid supply line, gear means driven by said hydraulic motor for actuating endless crawler treads, and braking means for operatively engaging said gear means when said hydraulic motor is not in operation, said braking means comprising an hydraulic cylinder having a piston mounted therein, a spring mounted in said cylinder in compressive relation to said piston to normally urge said piston toward one end of said cylinder, an hydraulic port mounted in said one end of said cylinder and having means connecting said port to said fluid supply line for automatically acting on said piston and the compressive force of said spring when pressure is present in said fluid supply line, a brake band having a slot therethrough and encircling said gear means, a first bracket attached to said brake band opposite the slot, said piston being pivotally anchored to said bracket, a second bracket attached to said brake band at one side of the slot, lever means pivotally connecting said one end of said cylinder to the second bracket, and means anchored to the brake band on the other side of the slot and pivotally connected to said lever means at a point adjacent the connection of the lever means to said second bracket.

2. A crawler-type vehicle comprising a frame having front and rear axles mounted therein, a sprocket mounted near the end of each axle, crawler treads mounted around the sprockets on either side of the frame, an additional drive sprocket mounted on each end of the front axle, a pair of hydraulic motors having fluid supply lines connected thereto, a reduction gear box having worm gear means therein and a sprocket gear mounted thereon connected to each of said hydraulic motors, a pair of drive chains linking together the respective sprocket gears and drive sprockets, and braking means for automatically applying a braking force to each of said worm gear means to prevent rotation thereof when the associated hydraulic motors are not in operation, each of said braking means comprising an hydraulic cylinder in communication with one of said fluid supply lines and actuated thereby for releasing said braking means and spring means for applying said braking means when said hydraulic motors are not driving said crawler treads.

3. A crawler-type vehicle comprising a frame having crawler treads mounted thereon, an hydraulic motor having a fluid supply line communicating with a source of fluid pressure, means for connecting said hydraulic motor to one of said crawler treads, and braking means for engaging said connecting means to prevent rotation thereof when said hydraulic motor is not in operation, said braking means comprising a slotted brake band and an hydraulic cylinder having a piston mounted therein, a spring mounted in said cylinder in compressive relation to said piston to normally urge said piston toward one end of said cylinder, an hydraulic port mounted in said one end of said cylinder and connected to said fluid supply line whereby pressure in said fluid supply line acts against said piston and the compressive force of said spring, said slotted brake band operatively engaging a portion of said connecting means for applying a braking force thereto, a bracket attached to said brake band opposite the slot, said piston being pivotally anchored to said bracket, a second bracket attached to said brake band at one side of the slot, lever means pivotally connecting said one end of said cylinder to said second bracket, and means anchored to the brake band on the other side of the slot and pivotally connected to said lever means at a point adjacent the connection of the lever means to said second bracket.

4. A crawler-type vehicle comprising a frame having front and rear axles mounted therein, a sprocket mounted near the end of each axle, crawler treads mounted around the sprockets on either side of the frame, an additional drive sprocket mounted on each end of the front axle, a pair of hydraulic motors having fluid supply lines connected thereto, a reduction gear box having worm gearing therein and a sprocket gear mounted thereon connected to each of said hydraulic motors, a pair of drive chains linking together the respective sprocket gears and drive sprockets, and braking means for engaging each of said worm gearing to prevent rotation thereof when the associated hydraulic motors are not in operation, each of said braking means comprising a slotted brake band and an hydraulic cylinder having a piston mounted therein, a spring mounted in said cylinder in compressive relation to said piston to normally urge said piston toward one end of said cylinder, an hydraulic port mounted in said one end of said cylinder and connected to said fluid supply line whereby pressure in said fluid supply line acts against said piston and the compressive force of said spring, said slotted brake band operatively engaging each of said worm gearing, a bracket attached to said brake band opposite the slot, said piston being pivotally anchored to said bracket, a second bracket attached to said brake band at one side of the slot, lever means pivotally connecting said one end of said cylinder to said second bracket, and means anchored to the brake band on the other side of the slot and pivotally connected to said lever means at a point adjacent the connection of the lever means to said second bracket.

5. In a vehicle control system of the type described, a source of fluid pressure, valve means, a first fluid supply line connecting the source and the valve means, means for driving the vehicle, a second fluid supply line connecting the valve means and the driving means, the pressure in the first supply line increasing when the valve means is opened to allow fluid to flow to the driving means, spring applied-fluid pressure released brake means, and a third fluid supply line connecting the first line and the brake means whereupon said increase in pressure releases the brake means.

6. In a vehicle control system of the type described, a source of fluid pressure, valve means, a first fluid supply line connecting the source and the valve means, motor means, gear means driven by the motor means for driving the vehicle, a second fluid supply line connecting the valve means and the motor means, the pressure in the first supply line increasing when the valve means is opened to allow fluid to flow to the motor means, spring applied-fluid pressure released brake means for applying a braking force to the gear means, and a third fluid supply line connecting the first line and the brake means whereupon said increase in pressure releases the brake means.

7. In a vehicle control system of the type described, a source of fluid pressure, valve means, a first fluid supply line connecting the source and the valve means, motor means, gear means driven by the motor means for driving the vehicle, a second fluid supply line connecting the valve means and the motor means, the pressure in the first supply line increasing when the valve means is opened to allow fluid to flow to the motor means, brake means for applying a braking force to the gear means, said brake means including a spring for supplying the braking force and a cylinder device for acting against the force of the spring for releasing the braking force, and a third fluid supply line connecting the first line and the cylinder device whereupon said increase in pressure releases the brake means.

8. In a vehicle control system of the type described; a source of fluid pressure; valve means; a first fluid supply line connecting the source and the valve means; motor means; gear means driven by the motor means for driving the vehicle, said gear means including a worm gear shaft; a second fluid supply line connecting the valve means and the motor means, the pressure in the first supply line increasing when the valve means is opened to allow fluid to flow to the motor means; brake means including a brake drum fixed on the worm gear shaft, a brake band for contacting the brake drum, a spring for supplying the braking force, and a cylinder device for acting against the force of the spring for releasing the braking force; and a third fluid supply line connecting the first line and the cylinder device whereupon said increase in pressure releases the brake means.

9. In a vehicle control system of the type described; a source of fluid pressure; valve means; a first fluid supply line connecting the source and the valve means; motor means; gear box means including first gear means driven by the motor means, a shaft driven by the first gear means and having a worm gear thereon, second gear means for driving the vehicle and being driven by the worm gear; a second fluid supply line connecting the valve means and the motor means, the pressure in the first supply line increasing when the valve means is opened to allow fluid to flow to the motor means; brake means including a brake drum fixed on the shaft, a brake band for contacting the brake drum, a spring for supplying a braking force, and a cylinder device for acting against the force of the spring for releasing the braking force; and a third fluid supply line connecting the first line and the cylinder device whereupon said increase in pressure releases the brake means.

References Cited in the file of this patent

UNITED STATES PATENTS

| 1,435,910 | Bailard | Nov. 21, 1922 |
| 1,540,170 | Frick | June 2, 1925 |
| 1,698,612 | Todd | Jan. 8, 1929 |
| 2,357,724 | Beltz | Sept. 5, 1944 |
| 2,384,346 | Schnell | Sept. 4, 1945 |
| 2,656,904 | Grenier | Oct. 27, 1953 |
| 2,726,641 | Hepola | Dec. 13, 1955 |
| 2,791,918 | Frellsen | May 14, 1957 |
| 2,831,554 | Reynolds | Apr. 22, 1958 |
| 2,927,669 | Walderowski | Mar. 8, 1960 |

FOREIGN PATENTS

| 84,061 | Sweden | June 13, 1935 |